May 28, 1957     A. KOBAN     2,793,425
WELDING JIG
Filed Aug. 2, 1954     2 Sheets-Sheet 1
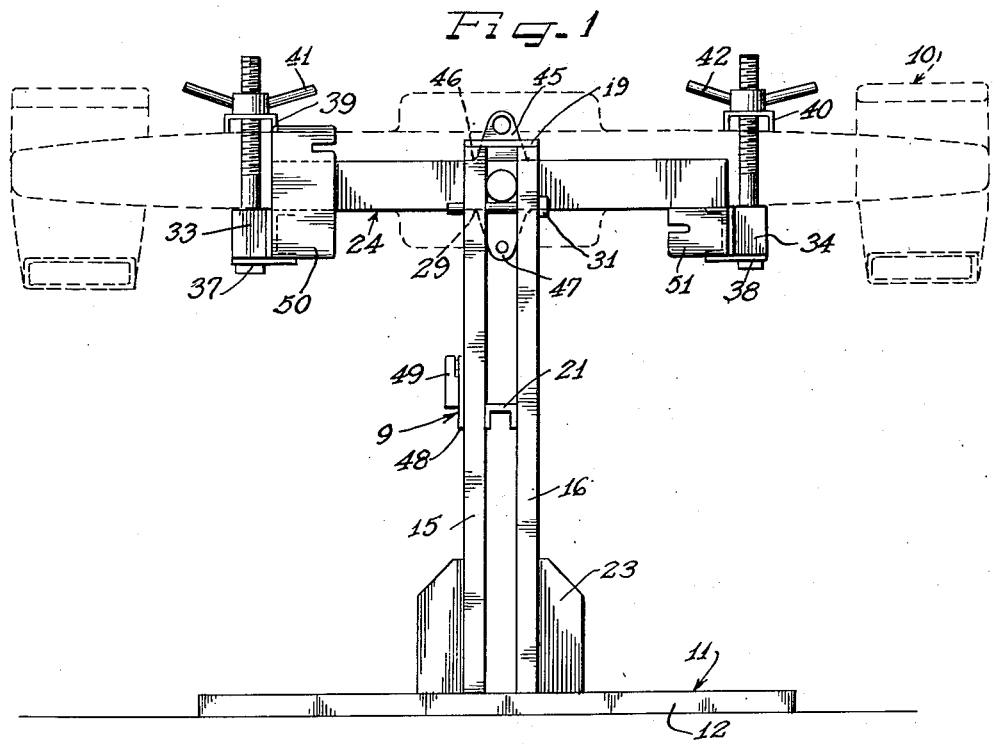
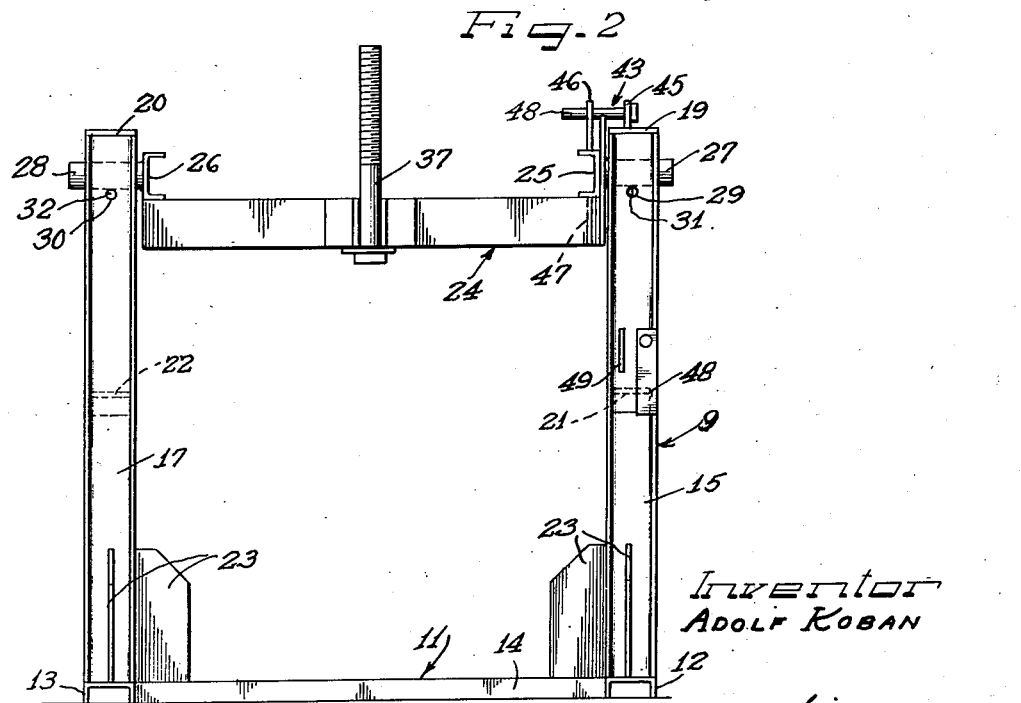
Inventor
ADOLF KOBAN
by Hill, Sherman, Meroni, Gross & Simpson Attys.

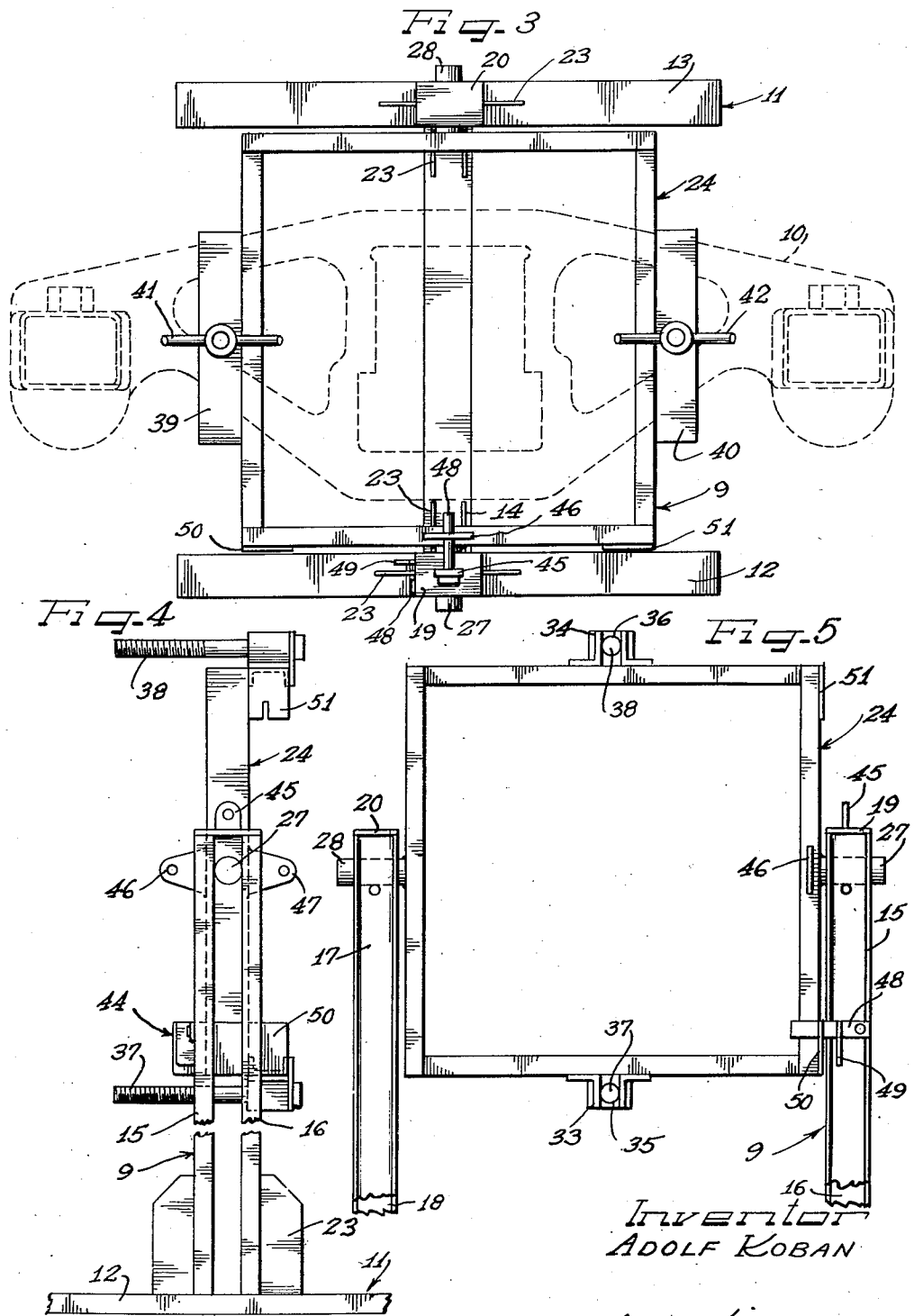

2,793,425

WELDING JIG

Adolf Koban, Chicago, Ill.

Application August 2, 1954, Serial No. 447,164

1 Claim. (Cl. 29—288)

This invention relates generally to a jig and, more particularly, to a welding jig usable in the repair of cumbersome railway equipment.

The present invention was developed for facilitating welding and other repair operations on worn panels or side frames of railroad trucks after they have been dismantled from the truck. These side frames, after becoming cracked or worn down through long use, can be built up by welding, grinding and like operations.

According to this invention, a heavy cumbersome side frame, after being secured on the jig, can be easily moved to any position selected by the welder or repairman to give easy access to any damaged surface. The jig of this invention has a table or carriage on which the panel or side frame is easily affixed. This carriage is rotatable to tilt the panel or frame to any desired position. Locks are provided to hold the frame in four fixed positions.

It is, therefore, an object of this invention to provide a welding jig which not only serves as a time-saver, but, in addition, serves as a safety device since it greatly reduces heavy manual moving tending to minimize employee injury due to such moving.

Another object of this invention is to provide a welding jig which will fixedly support a side panel or frame for railroad car trucks in any one of four different positions and will easily move the panel or frame between those positions.

Still another object of this invention is to provide a welding jig which will hold the side car panel in either a perpendicular or a horizontal position to present all faces of the panel in a flat bottom plane, thus facilitating the puddling of molten welding material in repairing damaged surfaces.

In accordance with the general features of this invention, there is provided in a welding jig for use in the repair of a railroad car side panel, a frame for engaging and supporting a medial portion of the truck panel, and including means for clamping the panel thereto, spaced vertical uprights between and on which the frame is pivotally carried for swinging movement, the frame being swingable from a horizontal position to an up-side-down position and being swingable to a vertical position on one side of the axis as well as to the other side, whereby the panel is swingable through substantially 360° in both horizontal and vertical directions.

Another feature of this invention relates to the provision of means for securing the frame with the panel thereon to at least one of the uprights in any one of the four positions.

Other objects and features of this invention will more fully appear from the following detailed description taken in connection with the accompanying drawings which illustrate a single embodiment thereof, and in which:

Figure 1 is a side elevational view of my novel welding jig showing in dotted lines how a railway car side panel is pivotally carried by the jig;

Figure 2 is an end view of my novel welding jig showing how the frame may be locked to the vertical uprights;

Figure 3 is a plan view of my novel welding jig showing the railway side car panel in dotted lines and how it is fixedly secured to the frame;

Figure 4 is a fragmentary side elevational view showing how the pivotal frame is maintained in vertical relation to the base; and Figure 5 is a fragmentary end view of my novel welding jig showing how the frame is maintained in a vertical position.

As shown on the drawings:

The reference numeral 9 indicates generally my novel welding jig which is particularly adapted to support a railroad side car panel 10 after it has been dismantled from a railroad car truck (not shown).

For purposes of simplification, the same reference numerals will be used throughout the drawings.

Referring to Figures 1 and 2, it is seen that my novel jig 9 includes an I-like base member 11 having longitudinal feet 12—13 and interconnected by a transverse leg 14.

Projecting vertically upwardly from the feet 12 and 13 is a pair of vertical uprights, 15—16, 17—18, respectively. Each of the pairs of uprights being interconnected at their upper extremities by strut members 19—20, respectively, and, additionally, intermediately reinforced by U-shaped braces 21—22. In addition, at the junction of the uprights and longitudinal legs, a plurality of gussets 23 are utilized to further reinforce and maintain the uprights in a perpendicular position relative to the base member 11.

A table or frame 24 is pivotally suspended between the respective pairs of vertical uprights. The frame 24 simulates a box-like member and has two opposed U-shaped members 25—26 integrally attached thereto (Figure 2). Each of the members 25—26 has a pin 27—28 projecting laterally outwardly therefrom and each of the cylindrical pins 27—28 are insertable into the gap defined by the respective pairs of vertical uprights 15—16 and 17—18, respectively. Thus, the uprights serve to eliminate any horizontal movement of the frame 24.

Insertable transversely through apertures 29—30 of the respective pairs of uprights relative to the pins 27—28 are pins 31—32 which provide vertical support for the frame. It is now seen that the cylindrical pins 27—28, while being confined horizontally and vertically, are free to rotate within the circumscribed area.

Integral at opposite ends of frame 24 are offset portions 33—34, each of which are apertured at 35—36 to receive studs 37—38 projecting therethrough (Figure 5).

In the course of mounting a side car panel 10 on the frame 24, initially, the frame 24 is secured (by means described hereinafter) in a horizontal position whence the panel 10 is lifted and put onto the frame 24 with studs 37—38 projecting through openings in the panel 10. Thereafter, apertured bars 39—40 are slipped over studs 37—38, the bars lying flush on the panel 10. Subsequently, wing nuts 41—42 are threaded onto studs 37—38 to firmly clamp the panel 10 between the frame 24 and the bars 39—40.

Referring now to the clamping or securing means, it will be seen that Figures 1, 2 and 3 highlight how the frame 24 may be secured in a horizontal position while Figures 4 and 5 illustrate the latching means for maintaining the frame 24 in a vertical position. The horizontal securing means has been designated generally by the numeral 43, and the vertical latching means generally by the numeral 44 (Figures 2 and 4).

The horizontal securing means 43 includes an apertured flange or eye bracket 45 projecting generally perpendicular to stud 19; a pair of apertured members or eye brackets 46—47 integral with and extending outwardly on opposite sides of U-shaped bracket 25; and a pin 48 adapted to be inserted through eye bracket 45 and optionally through either of the eye brackets 46—47, depending on which side of the panel 10 is to be worked upon. Thus, the frame 24 carrying the railroad side car panel or the like 10 is swingable through 360° and may be maintained in any one of the two horizontal positions.

As previously mentioned, vertical latching means 44 has been provided for my novel welding jig 9 and includes the following parts: a pivotally mounted bar 48 and a slotted bar receiving flange 49, both of which are secured to uprights 15; and slotted bar receiving members 50—51 positioned on the opposite ends of frame 24 on the side adjacent uprights 15—16.

Hence, the frame 24 may be maintained in any one of two vertical positions at the option of the welder by aligning slotted flange 49 with either one of members 50—51 and thereafter dropping bar 48 into the aligned slots so as to hold the frame and its supporting structure in unitary relationship.

In summation, my novel jig 9 which may be made of any suitable material is so constructed as to be of material assistance to a workman who works on heavy equipment such as railroad side car panels and permits him to rotate the frame or carriage holding the panel to any one of four positions, thus giving him ready access to all areas of the panel.

It will be understood that modifications and variations may be effected without departing from the scope of the novel concepts of the present invention.

I claim as my invention:

A jig for use in repairing railroad sidecar panels to present worn panel surfaces in a flat bottom plane for facilitating puddling of molten welding material to the worn surfaces comprising, a pair of longitudinal extending feet, a transverse leg connecting the central portions of the feet, uprights on the central portions of the feet, a table between said uprights having a pair of side members each adjacent the top ends of the uprights and a pair of cross support members fixedly connecting the ends of the side members at the bottoms of the side members, pivot pins extending outwardly from the mid portions of the side members, means on said uprights journaling said pins to rotatably support the table, bosses on the center portions of the support members, clamping bolts journaled in said bosses and projecting therefrom, said table being shorter but wider than the side panel to receive the panel on the cross support members between the side members thereof with the cross members inwardly from the ends of the panel and positioning the bosses thereon to align the clamping bolts with apertures in the panel, said bolts being long enough to project above the panel, clamping means on the bolts for overlying the panel to fixedly secure the panel to the table, one of said side members of the table having apertured ears projecting from the top and bottom thereof adjacent the pivot pin thereon, a pin carried by the adjacent upright for selective engagement with an ear to hold the table in top side up and bottom side up horizontal positions, slotted lugs on one side of the table adjacent the ends of the cross support members, and a latch bar pivoted on the upright adjacent the slotted lug-carrying side of the table at a level to fit in a lug slot and hold the table in upright positions.

References Cited in the file of this patent
UNITED STATES PATENTS

| | | |
|---|---|---|
| 1,559,453 | Printer et al. | Oct. 27, 1927 |
| 1,860,844 | Sorensen | May 31, 1932 |
| 2,208,251 | Evans | July 16, 1940 |
| 2,269,946 | Lange | Jan. 13, 1942 |
| 2,324,919 | Fine et al. | July 20, 1943 |
| 2,536,239 | Tyndall | Jan. 2, 1951 |
| 2,542,780 | Roos | Feb. 20, 1951 |